US006716788B2

(12) United States Patent
Eleveld et al.

(10) Patent No.: US 6,716,788 B2
(45) Date of Patent: Apr. 6, 2004

(54) PREPARATION OF A DOUBLE METAL CYANIDE CATALYST

(75) Inventors: Michiel Barend Eleveld, Amsterdam (NL); Robert Adrianus Wilhelmus Grotenbreg, Amsterdam (NL); Ronald Van Kempen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/457,988

(22) Filed: Jun. 10, 2003

(65) Prior Publication Data

US 2003/0236162 A1 Dec. 25, 2003

(30) Foreign Application Priority Data

Jun. 14, 2002 (EP) .............................................. 02254161

(51) Int. Cl.⁷ .......................... C08G 65/04; C07C 43/11; C07C 43/18
(52) U.S. Cl. ....................... 502/175; 502/200; 528/403; 528/405; 528/408; 528/409; 528/410; 528/411; 528/412; 528/413; 528/414; 528/415; 568/616; 568/618; 568/619; 568/620; 560/1
(58) Field of Search ................................. 502/175, 200; 528/403, 405, 408, 409, 410, 411, 412, 413, 414, 415; 568/616, 618, 619, 620; 560/1

(56) References Cited

U.S. PATENT DOCUMENTS

| 5,158,922 A | | 10/1992 | Hinney et al. ............... 502/175 |
| 5,527,880 A | * | 6/1996 | Le-Khac ...................... 528/415 |
| 5,767,323 A | | 6/1998 | Televantos et al. ......... 568/613 |
| 5,783,513 A | * | 7/1998 | Combs et al. .............. 502/175 |
| 5,900,384 A | * | 5/1999 | Soltani-Ahmadi et al. .. 502/175 |
| 5,998,327 A | * | 12/1999 | Hofmann et al. ........... 502/175 |
| 6,355,845 B1 | | 3/2002 | Clement et al. ............ 568/613 |
| 6,423,662 B1 | * | 7/2002 | Molzahn et al. ............ 502/175 |

FOREIGN PATENT DOCUMENTS

| EP | 892.002 | 7/1998 |
| WO | 98/40162 | 9/1998 |
| WO | 01/72418 | 10/2001 |
| WO | 01/89688 | 11/2001 |

OTHER PUBLICATIONS

International Search Report, dated Sep. 17, 2003.

* cited by examiner

*Primary Examiner*—Elizabeth D. Wood

(57) ABSTRACT

The present invention relates to a process for the preparation of a double metal cyanide (DMC) catalyst, which process involves:

(a) combining an aqueous solution of a metal salt with an aqueous solution of a metal cyanide salt and reacting these solutions; and (b) recovering the DMC catalyst from the reaction mixture, in which process the DMC catalyst is prepared in the presence of from 0.03 to 0.4 mole of alkaline metal compound, based on amount of metal salt.

Further, the present invention relates to DMC catalyst obtainable by such process, to DMC catalyst prepared from a metal salt and a metal cyanide salt in which the molar ratio of metal derived from the metal salt to metal derived from the metal cyanide salt is at least 2.25 and to a process for polymerization of alkylene oxides which process involves reacting initiator with alkylene oxide in the presence of at most 15 ppm of DMC catalyst.

10 Claims, No Drawings

PREPARATION OF A DOUBLE METAL CYANIDE CATALYST

The present invention relates to a process for the preparation of a double metal cyanide catalyst, to a double metal cyanide catalyst per se, and to a process for the polymerization of alkylene oxides with the help of a double metal cyanide catalyst.

BACKGROUND OF THE INVENTION

Double metal cyanide (DMC) compounds are well known catalysts for epoxide polymerization, i.e. for polymerizing alkylene oxides like propylene oxide and ethylene oxide to yield poly(alkylene oxide) polymers, also referred to as polyether polyols. The catalysts are highly active, and give polyether polyols that have low unsaturation compared with similar polyols made using strong basic catalysts like potassium hydroxide. In addition to the preparation of polyether polyols, the catalysts can be used to make a variety of polymer products, including polyester polyols and polyetherester polyols. The polyols can be used to prepare polyurethanes by reacting them with polyisocyanates under appropriate conditions. Polyurethane products that can be made include polyurethane coatings, elastomers, sealants, foams, and adhesives.

Although active catalysts can be prepared with the help of the prior art processes, there is interest in further increasing the activity further.

WO 98/40162 describes a process for making double metal cyanide catalysts by reacting an aqueous solution of potassium hexacyanocobaltate, tert-butyl alcohol and an aqueous solution of zinc chloride in which the alkalinity of the aqueous solution of zinc chloride is about 0.2 to 2.0% wt of zinc oxide based on the amount of zinc chloride in the solution, most preferably from about 0.4 to about 0.9% wt. An amount of zinc oxide of 1.13% wt (Example 7) is considered too high: the polyols obtained had increased unsaturation and increased viscosity. 1.13% wt of zinc oxide corresponds with 0.019 mole of zinc oxide per mole of metal salt.

SUMMARY OF THE INVENTION

Contrary to the teaching of WO 98/40162, it has now been found that more active catalysts can be prepared in the presence of higher amounts of alkaline metal.

Therefore, the present invention relates to a process for the preparation of a double metal cyanide (DMC) catalyst, which process comprises:

(a) combining an aqueous solution of a metal salt with an aqueous solution of a metal cyanide salt and reacting these solutions; and (b) recovering the DMC catalyst from the reaction mixture, in which process the DMC catalyst is prepared in the presence of from 0.03 to 0.4 mole of alkaline metal compound, based on amount of metal salt.

It has been found that the catalysts obtained by the process according to the present invention have unique characteristics. In addition to an increased activity, it was found that the molar ratio of metal derived from the metal salt to metal derived from the metal cyanide salt was higher than observed in catalysts prepared according to known methods. Therefore, the present invention further relates to double metal cyanide catalyst obtainable by a process according to the present invention, and to double metal cyanide catalyst prepared from a metal salt and a metal cyanide salt in which the molar ratio of metal derived from the metal salt to metal derived from the metal cyanide salt is at least 2.25.

The high activity of the present catalyst makes it possible to operate at much lower catalyst concentration than was envisaged until now.

Therefore, the present invention further relates to a process for the polymerization of alkylene oxides, which process comprises reacting initiator with alkylene oxide in the presence of at most 15 ppm of DMC catalyst.

DETAILED DESCRIPTION OF THE INVENTION

The process according to the present invention comprises preparation of the DMC catalyst in the presence of from 0.03 to 0.4 mole of alkaline metal compound, based on amount of metal salt. This alkaline metal compound can be present in any part of the preparation. Suitable methods comprise adding the alkaline metal compound to the metal salt solution and/or to the metal cyanide salt solution. A further method comprises adding the alkaline metal compound to solution which contains the DMC catalyst while it is being formed. In the latter method, the addition of alkaline metal compound can be carried out at any time during preparation of the catalyst, such as shortly after the aqueous solutions have been added together, during formation of the complex or during the further treatment of the complex that has been formed. Furthermore, the alkaline metal compound can be added at several different stages of the catalyst preparation. Improved activity was observed even if the alkaline metal compound was added when the complex had already been formed.

Preferably, the alkaline metal compound is present during reaction of the aqueous solution of metal salt and aqueous solution of a metal cyanide salt.

Alkaline compounds are those that give a solution having a pH greater than 7.0 when added to pure water.

When calculating the amount of alkaline metal compound which is present, the amount of such compound present in starting compounds such as zinc chloride, should also be taken into account.

The amount of alkaline metal is at least 0.03 mole of alkaline metal compound, based on molar amount of metal salt. The molar amount of metal salt is considered to be the total molar amount of metal salts present including the alkaline metal compounds such as metal oxides and metal hydroxides. Preferably, the amount is at least 0.035, more preferably at least 0.04.

The amount of alkaline metal strongly depends on the kind of alkaline metal compound present. It will be appreciated that the amount will generally be lower if a metal oxide is used than if a metal hydroxide is used. Generally, the amount of alkaline metal compound will be less than 0.4 mole, more specifically less than 0.3 mole.

A large variety of alkaline metal compounds have been found to be suitable for use in the present invention. Additionally, the alkaline metal compound does not need to be added as such but can be formed in-situ as well.

Preferred alkaline metal compounds are the hydroxides and/or oxides of metals. Metals which are especially suitable for use are metals of group 1a, 2a, 2b and 8 of the Periodic Table of the Elements of the Handbook of Chemistry and Physics, 63$^{rd}$ Edition. More specifically, the alkaline metal compounds are preferably hydroxides and/or oxides of one or more metals chosen from the group consisting to group 1a, 2a and the metal present in the metal salt and/or the metal cyanide salt. Preferably, the alkaline metal compound is one or more compound chosen from the group consisting zinc oxide, sodium hydroxide, potassium hydroxide, calcium oxide and/or barium oxide.

In the process of the invention, an aqueous solution of a metal salt and an aqueous solution of a metal cyanide salt are combined and reacted. Generally, this will be done in the presence of an organic complexing agent.

The metal salt preferably is water soluble and generally has the general formula $M(X)_n$, in which M is selected from the group consisting of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II), and Cr(III). More preferably, M is selected from the group consisting of the metals of group 2b and 8 of the Periodic Table of the Elements of the Handbook of Chemistry and Physics, 63rd Edition. Preferably, M is zinc, iron, cobalt and/or nickel. More specifically, M is selected from the group consisting of Zn(II), Fe(II), Co(II), and Ni(II). In the formula, X is preferably an anion selected from the group consisting of halide, hydroxide, sulfate, carbonate, cyanide, oxalate, thiocyanate, isocyanate, isothiocyanate, carboxylate, and nitrate. The value of n generally is from 1 to 3 and satisfies the valency state of M. Examples of suitable metal salts include, but are not limited to, zinc chloride, zinc bromide, zinc acetate, zinc acetonylacetate, zinc benzoate, zinc nitrate, iron(II) sulfate, iron(II) bromide, cobalt(II) chloride, cobalt(II) thiocyanate, nickel(II) formate, nickel(II) nitrate, and the like, and mixtures thereof. Zinc chloride is most preferred.

The metal cyanide salt preferably is water soluble and generally has the general formula $Y_a M^1(CN)_b A_c$. In this salt M' is one or more metal selected from group 5b, 6b, 7b, 8 of the Periodic Table of the Elements of the Handbook of Chemistry and Physics, $63^{rd}$ Edition. Preferably, M' is one or more metal selected from the group consisting of iron, cobalt, chromium, manganese, iridium, nickel, rhodium, ruthenium and vanadium. In these instances, M' usually was found to be present as Fe(II), Fe(III), Co(II), Co(III), Cr(II), Cr(III), Mn(II), Mn(III), Ir(III), Ni(II), Rh(III), Ru(III), V(IV) and/or V(V). More specifically, M' is one or more metal selected from the group consisting of iron, cobalt, chromium, iridium and nickel. In these instances, M' usually was found to be present as Co(II), Co(III), Fe(II), Fe(III), Cr(II), Ir(III), and Ni(II). The metal cyanide salt can contain one or more of these metals. In the formula, Y is an alkali metal ion or alkaline earth metal ion. A is an anion selected from the group consisting of halide, hydroxide, sulfate, carbonate, cyanide, oxalate, thiocyanate, isocyanate, isothiocyanate, carboxylate, and nitrate. Both a and b are integers greater than or equal to 1; the sum of the charges of a, b, and c balances the charge of M'. Suitable metal cyanide salts include, but are not limited to, potassium hexacyanocobaltate(III), potassium hexacyanoferrate(II), potassium hexacyanoferrate(III), calcium hexacyanocobaltate(III), lithium hexacyanoiridate(III), and the like. Alkali metal hexacyanocobaltates are most preferred.

DMC catalysts made by the process of the invention will generally comprise an organic complexing agent. Generally, the complexing agent is relatively soluble in water. Suitable complexing agents are those commonly known in the art, as taught, for example, in U.S. Pat. No. 5,158,922, incorporated by reference herein. The complexing agent is added either during preparation or immediately following precipitation of the catalyst. Usually, an excess amount of the complexing agent is used. Preferred complexing agents are water-soluble heteroatom-containing organic compounds that can complex with the double metal cyanide compound. Suitable complexing agents include, but are not limited to, alcohols, aldehydes, ketones, ethers, esters, amides, ureas, nitrites, sulfides, and mixtures thereof. Preferred complexing agents are water-soluble aliphatic alcohols selected from the group consisting of ethanol, isopropyl alcohol, n-butyl alcohol, isobutyl alcohol, sec-butyl alcohol, and tert-butyl alcohol. Tert-butyl alcohol is most preferred.

Examples of double metal cyanide compounds that can be made by the process of the invention include, for example, zinc hexacyano-cobaltate(III), zinc hexacyanoferrate(III), zinc hexacyanoferrate(III), nickel(II) hexacyanoferrate(II), cobalt(II) hexacyanocobaltate(III), and the like. Further examples of suitable double metal cyanide compounds are listed in U.S. Pat. No. 5,158,922. Zinc hexacyanocobaltate is most preferred.

In a typical process for making DMC catalyst, an aqueous solution of the metal salt (e.g., zinc chloride) is first prepared. Next, the adjusted metal salt solution is combined and reacted with an aqueous solution of a metal cyanide salt (such as potassium hexacyanocobaltate) in the presence of an organic complexing agent (such as tert-butyl alcohol) using efficient mixing to produce a catalyst slurry. The catalyst slurry contains the reaction product of the metal salt and metal cyanide salt, which is the double metal complex. Also present are excess metal salt, water and organic complexing agent; each is incorporated to some extent in the catalyst structure.

The reactants are combined at any desired temperature. Preferably, the catalyst is prepared at a temperature within the range of about room temperature to 80° C., a more preferred range is from room temperature to 60° C.

The organic complexing agent can be included with either or both of the aqueous salt solutions, or it can be added to the catalyst slurry immediately following precipitation of the DMC compound. It is generally preferred to pre-mix the complexing agent with either aqueous solution, or both, before combining the reactants.

The initial DMC complex is formed in an aqueous reaction medium. The metal salts used and the salt formed during the complex formation reaction are well soluble in water and hence will be present in the aqueous phase. Since these salts are generally detrimental to the activity of the DMC complex catalyst, they are usually removed before the DMC catalyst is actually used for catalysing any alkoxylation reaction. The catalyst can be isolated from the catalyst slurry by any convenient means, such as filtration, centrifugation, decanting, or the like. Further, the isolated catalyst can be washed with an aqueous solution that optionally contains organic complexing agent. After the catalyst has been washed, it can be dried under vacuum until the catalyst reaches a constant weight. Suitable techniques for washing and isolating the catalyst are described in U.S. Pat. No. 5,482,908 herein incorporated by reference.

A preferred method for isolating the DMC catalyst has been described in WO 01/72418 herein incorporated by reference. This process comprises combining the dispersion of DMC catalyst with a liquid, which is essentially insoluble in water and which is capable of extracting the solid DMC complex formed from the aqueous medium, and allowing a two-phase system to be formed consisting of a first aqueous layer and a layer containing the DMC complex and the liquid added; subsequently, the first aqueous layer is removed and the DMC catalyst is recovered from the layer containing the DMC catalyst.

The DMC catalyst as used in the present invention, preferably is according to the following general formula

$Zn_2[Co(CN)_6]Cl.nX.mH_2O.pA$ wherein X is a complexing agent and A is a compound of general formula

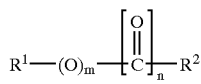

$$R^1-(O)_m-\left[\overset{O}{\underset{\|}{C}}\right]_n-R^2 \quad (I)$$

wherein:
- $R^1$ represents hydrogen, an aryl group, a substituted or unsubstituted $C_1$–$C_{10}$ alkyl group or a group $R^3$—NH—,
- $R^2$ represents hydrogen, an optionally halogenated $C_1$–$C_{10}$ alkyl group, a group $R_3$—NH—, a group —$R_4$—C(O)O—$R_5$ or a cyanide group,
- $R^3$ represents hydrogen or a $C_1$–$C_{10}$ alkyl group,
- $R^4$ represents a substituted or unsubstituted alkylene group having 2 to 15 carbon atoms,
- $R^5$ represents hydrogen, a substituted or unsubstituted $C_1$–$C_{10}$ alkyl group, and
- n is 0 to 10, m is from 0 to 20 and p is from 0 to 10.

Catalysts made by the process of the invention have been found to be unique. It was observed that catalysts prepared by the process according to the present invention have improved activity. Additionally, it was observed that these catalysts had a higher molar ratio of metal derived from the metal salt to metal derived from the metal cyanide salt than previously observed.

Therefore, the process according to the present invention further relates to a double metal cyanide catalyst obtainable by a process according to the present invention.

DMC catalysts prepared according to the present invention were found to have a molar ratio of metal derived from the metal salt to metal derived from the metal cyanide salt of at least 2.25. Such high ratio was not observed for DMC catalysts prepared with the help of conventional preparation processes. Therefore, the present invention further relates to a double metal cyanide catalyst prepared from a metal salt and a metal cyanide salt in which the molar ratio of metal derived from the metal salt to metal derived from the metal cyanide salt is at least 2.25.

The molar ratio of metal derived from the metal salt to metal derived from the metal cyanide salt more specifically is at least 2.26, more specifically at least 2.27, more specifically at least 2.28, most specifically more than 2.28. In principle, there is no upper limit for the molar ratio. However, in most instances the molar ratio was at most 3. More specifically, the molar ratio was less than 3, more specifically at most 2.8, more specifically at most 2.7.

In the DMC catalysts according to the present invention, the metal derived from the metal salt most preferably is zinc and the metal derived from the metal cyanide salt most preferably is cobalt.

As mentioned, the DMC catalyst according to the present invention shows a surprisingly high activity, allowing the catalyst to be used at very low concentrations. Therefore, the present invention further relates to a process for the polymerization of alkylene oxides, which process comprises reacting initiator with alkylene oxide in the presence of at most 15 ppm of DMC catalyst. The amount of DMC catalyst is based on the amount of end product.

Due to the activity of the DMC catalyst, the polymerization of alkylene oxides can be carried out at very low concentrations of DMC catalyst. The concentration can be as low as less than 15 ppm of DMC catalyst, more specifically at most 14 ppm, more specifically less than 14 ppm, more specifically at most 13 ppm, more specifically less than 13 ppm, more specifically at most 12 ppm, more specifically less than 12 ppm, more specifically at most 11 ppm, more specifically less than 11 ppm, more specifically at most 10 ppm, more specifically less than 10 ppm.

Polymerization of alkylene oxides is typically carried out by reacting a mixture of hydroxyl group-containing initiator with DMC catalyst at a temperature of from 80° to 150° C., more particularly from 90° C. to 130° C. The pressure can be from atmospheric pressure (0 bar absolute, bara) to very high pressure. Usually, the pressure will not exceed 20 bar. Preferably, the pressure is of 0 to 5 bar absolute.

Preferred alkylene oxides for use in the present invention are ethylene oxide, propylene oxide, butene oxides, styrene oxide, and the like, and mixtures thereof.

A wide range of initiators can be used in the process according to the present invention. Initiators which are generally used are compounds having a plurality of active hydrogen. Preferred initiators include polyfunctional alcohols, generally containing 2 to 6 hydroxyl groups. Examples of such alcohols are glycol, such as diethylene glycol, dipropylene glycol, glycerol, di- and polyglycerols, pentaerythritol, trimethylolpropane, triethanolamine, sorbitol and mannitol.

The process according to the invention can be used to make homopolymers, random copolymers or block copolymers.

Polyether polyols made with the catalysts of the invention suitably have a nominal average functionality of from 2 to 8, more suitably from 2 to 6. The polyols may have a number average molecular weight up to 50,000, but typically the molecular weight is within the range of 500 to 12,000, more typically from 2,000 to 8,000.

The present invention is further illustrated by the following non-limiting examples.

EXAMPLES

Comparative Example 1

At room temperature, technical grade zinc chloride (30 g) was dissolved in de-ionized water (100 g) and charged to a 1-liter glass reactor equipped with a triple pitched bladed turbine. Subsequently tert-butyl alcohol (TBA) (117 g) and de-ionized water (95 g) were added. The technical grade zinc chloride contained 0.6% wt of zinc oxide, so 2.2 mmol of zinc oxide was present. Potassium hexacyanocobaltate (12 g) was dissolved in de-ionized water (225 g). In the course of 30 minutes, the aqueous potassium hexacyanocobaltate solution was added to the zinc chloride solution. The reactor content was well stirred during the addition. After addition the mixture was stirred for another 30 minutes and allowed to stand overnight.

The next day, tert-butyl methyl ether (MTBE) (12% wt on reactor content) was added and the reactor contents was mixed for 5 minutes. After 30 minutes settling the liquid layer was removed.

To the reactor a 25/75 (m/m) mixture of TBA and de-ionized water was added. The mixture was stirred for 5 minutes and after 30 minutes settling the liquid layer was removed.

To the reactor a 25/75 (m/m) mixture of TBA and de-ionised water and additional MTBE (2.5% wt on initial reactor content) were added. The mixture was stirred for 5 minutes and after 30 minutes settling the liquid layer was removed.

Subsequently TBA was added and the mixture is stirred for 30 minutes.

The solids content of the suspension was measured by weighing a sample and subsequently removing volatile components by stripping with the help of vacuum and a nitrogen purge at 50° C. until a constant weight is obtained. Based on this solids content, a polyether polyol (propoxylated glycerol having an average molecular weight of 670) was added to obtain a 3% wt zinc hexacyanocobaltate complex in polyether polyol suspension. After mixing for 30 minutes, the MTBE, TBA and water were removed by stripping at 80° C. and 50 mbar. The product obtained had a water content of less than 0.5% wt.

The catalyst obtained is hereinafter referred to as Comparative Catalyst 1.

Comparative Example 2

The procedure of Comparative Example 1 was repeated with the exception that pure zinc chloride (containing 0.07% wt of ZnO) is used instead of technical grade zinc chloride. Therefore, 0.2 mmol of zinc oxide was present.

The catalyst obtained is hereinafter referred to as Comparative Catalyst 2.

Example 1 (According to the Invention)

The procedure of Comparative Example 1 was repeated with the exception that instead of 30 g technical grade zinc chloride was used a mixture of 30 g pure zinc chloride (220 mmol, containing 0.2 mmol zinc oxide) and 7.4 mmol ZnO.

The catalyst obtained is hereinafter referred to as Catalyst 1.

Example 2 (According to the Invention)

The procedure of Comparative Example 1 was repeated with the exception that instead of 30 g technical grade zinc chloride was used a mixture of 30 g pure zinc chloride (220 mmol, containing 0.2 mmol zinc oxide) and 14.7 mmol KOH is used.

The catalyst obtained is hereinafter referred to as Catalyst 2.

Examples 3 and 4 (According to the Invention)

The procedure of Comparative Example 1 was repeated with the exception that instead of 30 g technical grade zinc chloride was used a mixture of 30 g pure zinc chloride (220 mmol, containing 0.2 mmol zinc oxide) and 7.4 mmol of CaO (Catalyst 3) and 7.4 mmol of BaO (Catalyst 4).

Examples 5, 6 and 7 (According to the Invention)

The procedure of Comparative Example 1 was repeated with the exception that instead of 30 g technical grade zinc chloride was used a mixture of 30 g pure zinc chloride (220 mmol, containing 0.2 mmol zinc oxide) and 11.1 mmol ZnO (Catalyst 5), 18.4 mmol ZnO (Catalyst 6) and 36.8 mmol ZnO (Catalyst 7).

Table 1 contains an overview of the zinc to cobalt molar ratio of the double metal cyanide catalysts obtained. The amount of the different kinds of metal was determined as follows with the help of a Philips PW1480 X-ray fluorescence (XRF) spectrometer. About 4 grams of the homogenized sample was poured into a polypropylene container and measured immediately after pouring. The XRF intensity measurements were made at line and background positions. A blank correction was made using net intensities measured on polyol sample. A series of carefully prepared high-dilution glass beads was used for calibration of the elements Zn, Co and K.

TABLE 1

|  | alkaline metal compound on metal salt (mol/mol) | Zn/Co ratio |
|---|---|---|
| Comparative Catalyst 1 | 0.01 | 2.20 |
| Catalyst 1 | 0.03 | 2.29 |
| Catalyst 2 | 0.07 | 2.29 |
| Catalyst 3 | 0.03 | 2.29 |
| Catalyst 4 | 0.03 | 2.30 |
| Catalyst 5 | 0.05 | 2.38 |
| Catalyst 6 | 0.08 | 2.55 |

Example 8

A 1.25 liter stirred tank reactor was charged with 89 g of propoxylated glycerol having an average molecular weight of 670 and 0.4 g of suspension containing 3% wt of DMC catalyst (15 ppm catalyst on end product).

The reactor was heated to 130° C. at a pressure of 0.1 bara or less with a small nitrogen purge. The reactor was evacuated and propylene oxide was added at a rate of 3.25 grams per minute until the pressure reached 1.3 bara. As soon as the reaction of propylene oxide made the pressure drop to less than 0.8 bara, the addition of propylene oxide was started again and was continued such that the pressure was kept between 0.6 and 0.8 bara.

After 311 g of propylene oxide were added, a polyether polyol having a molecular weight of 3000 was obtained and the addition of glycerine was started at a rate of 0.1 grams per minute. The addition was stopped when 698.7 g of propylene oxide and 12.3 g of glycerine had been added. The difference between the pressure during addition of propylene oxide and the pressure when the addition of propylene oxide had been stopped, was determined. This pressure difference is a measure for the activity of the catalyst. A lower pressure difference represents a more active catalyst. The results are given in Table 2.

TABLE 2

|  | Pressure difference (bara) |
|---|---|
| Comparative catalyst 1 | 0.62 |
| Comparative catalyst 2 | >2 |
| Catalyst 1 | 0.41 |
| Catalyst 2 | 0.42 |
| Catalyst 3 | 0.52 |
| Catalyst 4 | 0.51 |
| Catalyst 5 | 0.41 |

Example 9

To a 1.25 l continuously stirred tank reactor equipped with a level control system and filled with 800 g reaction product was added:

glycerol at a rate of 5.39 g/h
1,2-propanediol at a rate of 1.72 g/h
propylene oxide at a rate of 226 g/h
ethylene oxide at a rate of 32 g/h and
0.5% wt catalyst suspension at a rate of 1.60 g/h.

The catalyst suspension was obtained by diluting a suspension containing 3% wt of DMC catalyst in propoxylated glycerol having a molecular weight of 670 with the same polyether polyol until a 0.5% wt suspension was obtained.

The activity was measured by stopping the addition of the feedstocks and measuring the pressure decrease. A lower pressure difference represents a more active catalyst.

Additionally, the propylene oxide content of the product obtained was measured. A lower propylene oxide content represents a more active catalyst.

The results are given in Table 3.

TABLE 3

| Catalyst | Pressure difference (bara) | propylene oxide concentration in product (ppm) |
|---|---|---|
| Comparative Catalyst 1 | 0.60 | 5.534 |
| Catalyst 1 | 0.46 | 3.678 |
| Catalyst 5 | 0.49 | 3.440 |
| Catalyst 6 | 0.45 | 3.166 |

What is claimed:

1. A process for the preparation of a double metal cyanide (DMC) catalyst, which process comprises:

(a) combining an aqueous solution of a metal salt with an aqueous solution of a metal cyanide salt and reacting these solutions; and, (b) recovering the DMC catalyst from the reaction mixture, in which process the DMC catalyst is prepared in the presence of from 0.03 mole to 0.4 mole of alkaline metal compound, based on amount of metal salt.

2. The process of claim 1, in which the alkaline metal compound is a metal oxide and/or metal hydroxide.

3. The process of claim 1, in which process the DMC catalyst is prepared in the presence of from 0.03 mole to 0.3 mole of alkaline metal compound in step (a).

4. The process of claim 1, which process comprises combining an aqueous solution of zinc chloride with an aqueous solution of a cobalt cyanide salt.

5. A double metal cyanide catalyst obtained from a process comprising:

(a) combining an aqueous solution of a metal salt with an aqueous solution of a metal cyanide salt and reacting these solutions; and, (b) recovering the DMC catalyst from the reaction mixture, in which process the DMC catalyst is prepared in the presence of from 0.03 mole to 0.4 mole of alkaline metal compound, based on amount of metal salt.

6. A double metal cyanide catalyst prepared from a metal salt and a metal cyanide salt in which the molar ratio of metal derived from the metal salt to metal derived from the metal cyanide salt is at least 2.25.

7. The double metal cyanide catalyst of claim 6, in which the metal of the metal salt is selected from the group consisting of zinc, iron, cobalt and nickel and the metal of the metal cyanide salt is selected from the group consisting of iron, cobalt, chromium, iridium and nickel.

8. The double metal cyanide catalyst of claim 7, in which catalyst the molar ratio of zinc to cobalt is at least 2.25 and at most 2.8.

9. A process for the polymerization of alkylene oxides, which process comprises reacting initiator with alkylene oxide in the presence of at most 15 ppm of the DMC catalyst of claim 5, based on amount of product.

10. The process of claim 9, which process is carried out continuously.

* * * * *